Feb. 21, 1961

V. P. THOME 2,972,384

STONE GATHERER

Filed Feb. 27, 1959

INVENTOR.
VALENTINE P. THOME
BY
Lieber, Lieber & Nilles
ATTORNEYS

Feb. 21, 1961    V. P. THOME    2,972,384
STONE GATHERER
Filed Feb. 27, 1959    2 Sheets-Sheet 2
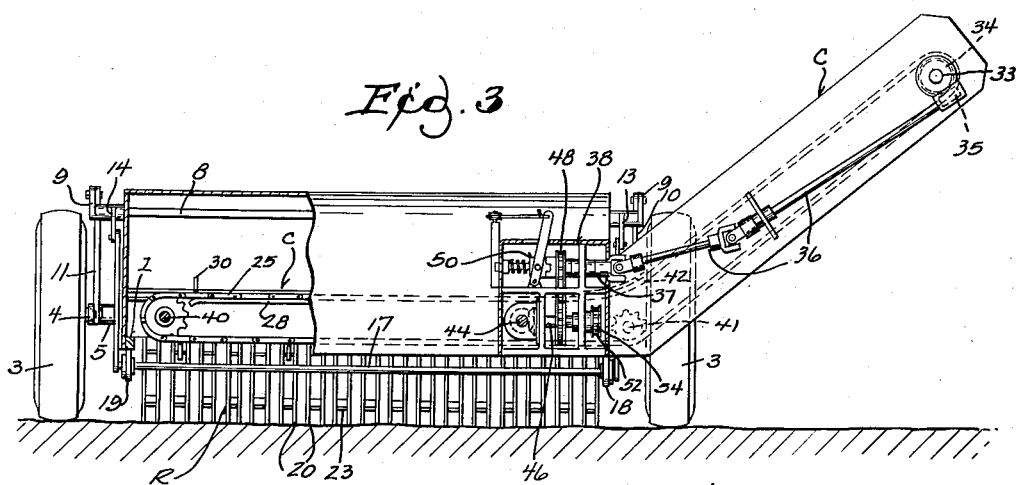
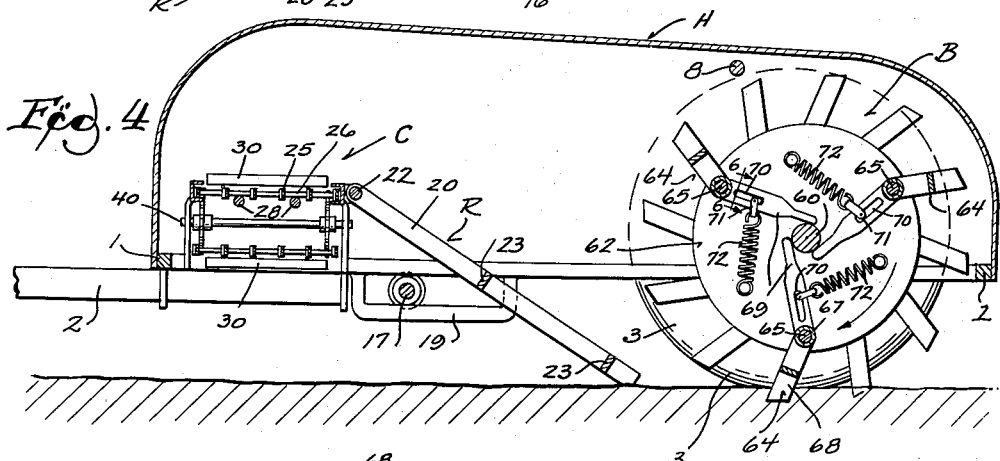
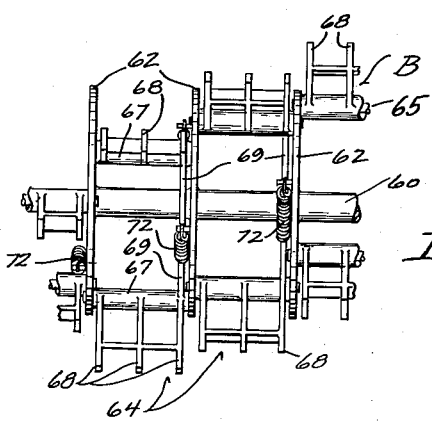
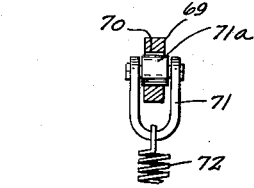
INVENTOR.
VALENTINE P. THOME
BY
Lieber, Lieber & Nilles
ATTORNEYS

United States Patent Office

2,972,384
Patented Feb. 21, 1961

2,972,384

STONE GATHERER

Valentine P. Thome, R.R. 4, Fond du Lac, Wis.

Filed Feb. 27, 1959, Ser. No. 796,073

6 Claims. (Cl. 171—63)

This invention relates to stone pickers of the type having a driven rotary beater which propels stones or rocks into a collecting conveyor as the vehicle traverses over the field being cleared.

Devices of this general nature have been proposed heretofore, but have proven to be not entirely satisfactory for a number of reasons. One of the greatest shortcomings of some of these machines has been the large amount of horsepower required to drive them and do a thorough job of picking stones located on or close to the surface of the ground. This excessive horsepower requirement was due in part to the manner in which the rotary beater engaged the stones, lifted them free of the earth and then propelled them to the collector.

Still other prior art machines have not been commercially successful because of their inability to do a thorough job of cleaning the ground or because of considerable maintenance problems due primarily to broken pick-up tines, or the like.

Accordingly, it is an object of the present invention to provide a stone gatherer which does a thorough job of picking stones that lie on or adjacent the surface of the ground, and one which will do so at a reasonable and practical horsepower requirement.

More particularly, the invention contemplates a picker of the above type in which rigid stone engaging fingers are not only spring loaded to relieve themselves upon striking excessively large or deeply buried stones, but also have a secondary release action. As a result the beater can be driven at a sufficiently high speed to thereby thoroughly clean a swath and propel stones of at least a certain predetermined size forcibly over a cleaning ramp and into a conveyor. The action is such that the stones are positively moved immediately upon impact by the blades and are almost completely freed of surrounding earth at an early stage of their travel. Most of the earth that remains with the stones after this initial impact is then caused to be separated therefrom by the ramp and/or conveyor against which they are thrown with considerable force. The length of time the stones are in contact with the rigid blades is relatively short, the action being more in the nature of a hard and sharp blow rather than a lifting or carrying action.

Another and important aspect of the invention is in the construction of the beater itself, which comprises circumferentially spaced rows of blades, the blades of each row being arranged in helical fashion around the beater and each also having spring cushioning means and also having an auxiliary release means. The beater thus provided is particularly efficient and smooth in its general operation because it distributes the load substantially evenly for any one of its rotations. The resulting action eliminates any severe jolts and peak horsepower loads.

These and other objects and advantages will appear later as this disclosure progresses, reference being had to the accompanying drawings, in which:

Figure 3 is a front elevational view of the machine, certain parts being broken away, in section or removed for clarity;

Figure 4 is a sectional view taken on line 4—4 in Figure 1, but on an enlarged scale;

Figure 5 is an enlarged, fragmentary view of the beater as shown in Figures 1 and 4, and Figure 6 is an enlarged view taken on line 6—6 of Figure 4.

Figure 2:
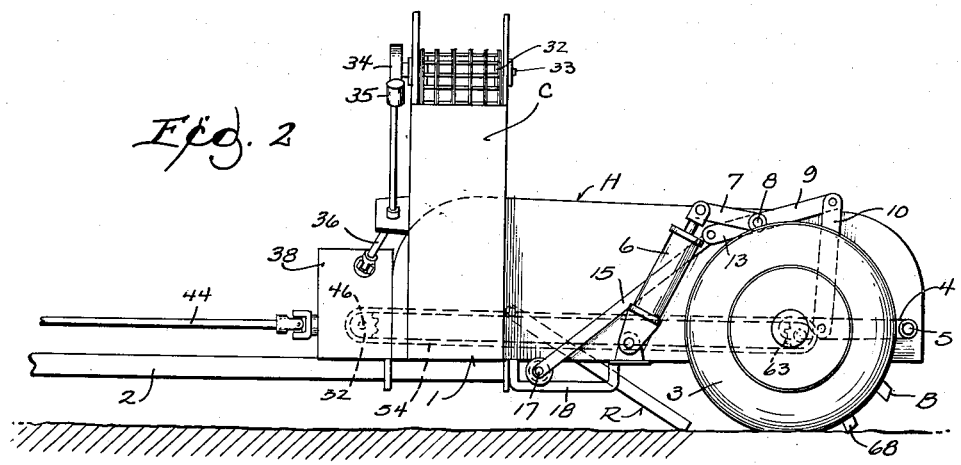
Figure 2 is a side elevational view of the machine shown in Figure 1.

Referring in greater detail to the drawings, the main frame 1 has a forwardly extending tongue 2 by which the machine is pulled by a suitable tractive vehicle (not shown). A pair of ground engaging wheels 3 support the machine at an adjustable height from the ground. These wheels are mounted on the free end of their respective cranks 4, the latter of which are pivotally mounted on the machine on their pivot shaft 5. The cranks 4 are swingable to vary the height of the machine relative to the ground by the large hydraulic cylinder unit 6 pivoted at its lower end to the machine frame and at its other end to one end of a crank arm 7. A jackshaft 8 is mounted across the upper portion of the machine and is rigidly connected at one end to an intermediate point of crank arm 7, while the other end of this jackshaft has an arm 9 fixed thereon. Lift links 10 and 11 connect wheel cranks 4 to arms 7 and 9, respectively.

Also secured adjacent each end of the jackshaft 8 are arms 13 and 14 to the free ends of which are pivotally attached the links 15 and 16, respectively. The lower ends of these links 15 and 16 are connected to the transverse pick-up rod 17 which is slidable in the guide brackets 18 and 19 that are located on opposite sides of the machine.

As the cylinder unit 6 is extended in the conventional manner, the jackshaft 8 is rotated in the clockwise direction (as viewed in Figure 1), to cause the wheel cranks 4 to swing downwardly and thereby raise the machine relative to the ground. This action varies the extent to which the teeth of beater B, to be described, penetrate the surface of the ground, and full extension of the cylinder unit raises the machine to a transport position. Full extension of the unit 6 also causes the pick-up bar 17 to slide rearwardly (to the right in Figures 2 and 4) and thereby limit the downward swinging of the ramp R when the machine is raised for transport.

Ramp

The ramp R comprises a series of pairs of flat steel bars 20 which are pivoted at their forward ends on shaft 22 carried by the support frame. The bars of each pair are rigidly secured together by cross braces 23 welded therebetween. Each pair of bars are free to rise and fall independently of any other pair and their lower ends are pulled along in engagement with the ground over which the machine moves. The spacing between each bar 20 is such so as to permit earth which is thrown against the ramp to fall therethrough, and yet prevents stones of any appreciable size from passing through the ramp.

Conveyor

Figure 1:
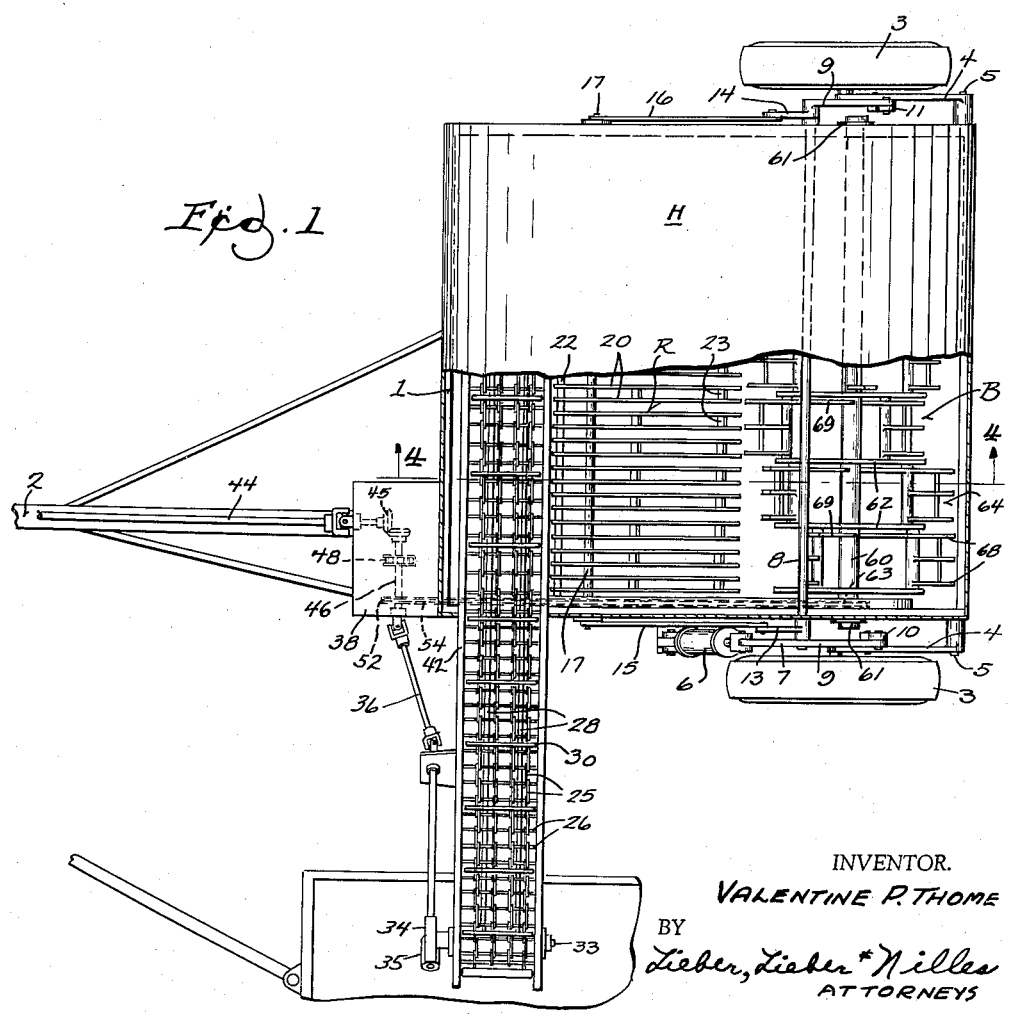
Figure 1 is a plan view of a machine embodying the present invention, certain parts being broken away or removed for the sake of clarity in the drawings.

A lateral conveyor C extends across the front portion of the machine and is located immediately in front of the upper end of the inclined ramp. This conveyor is of the endless type and consists of a series of links 25 which are pivotally connected together by cross rods 26 extending through the link ends, thereby forming an open and flexible belt. The upper flight of this conveyor rests on the two support bars 28 and is at the same height as the front end of the ramp. The conveyor also has paddles 30 secured at spaced locations along its length to cause the conveyor to more positively move stones out of the machine and particularly up the inclined outer end. The outer end of the conveyor is trained over the sprockets 32 carried on the drive shaft 33, the latter carrying a pinion 34. A worm gear 35 is in constant mesh with pinion 34 and is driven through the universally jointed drive shaft 36 extending from the counter shaft 37 in the transmission box 38. The endless conveyor is also trained over the sprocket carrying shafts 40 and 41, and also under the arcuate guide member 42 (Figures 1 and 3).

This particular conveyor is particularly rugged as it must be in order to take the abuse to which it is subjected.

*Power*

Power it furnished to the machine from the tractive vehicle via the power-take-off shaft 44 which drives the bevel gear 45 and shaft 46 located in the gear box 38. A sprocket and chain connection 48 transmits power from shaft 46 to shaft 37 and a manually operated clutch 50 can interrupt the drive to the conveyor. A sprocket 52 is also fixed to the end of shaft 46 and has a beater drive chain 54 trained thereover which extends rearwardly to drive the beater B.

*Beater*

The beater comprises a shaft 60 suitably journalled at each end in anti-friction bearing assemblies 61 carried in the side walls of the machine. A sprocket 63 receives the endless chain 54 by means of which the beater is rotated in the direction indicated by the curvilinear arrow in Figure 4.

The beater shaft 60 extends through a series of axially spaced large steel discs 62 which are welded or otherwise rigidly secured to the shaft, thereby forming a rotary cylindrical structure.

Between each of these discs are carried three sets 64 of blades, the sets being circumferentially spaced therearound and swingable on the shafts 65 secured between the discs.

The circumferential spacing of the sets of blades between one pair of discs, in relation to the sets between adjacent discs, is such that rows of blades are formed along the length of the beater, the rows being of helical form so as to "wind around" the beater.

Each set of blades comprises a sleeve hub 67 having three blades 68 welded thereto, the hubs being mounted on their respective shafts 65. The free end of the blades are cut off at an angle, the leading edge being the longest, which shape facilitates the passages of the blades through the earth by relieving any pressure on the "heel" or trailing corner of the blade.

Means are provided for cushioning the shock loads on the blades, and for also permitting tripping of the blades when a large obstruction is encountered, as follows.

Each set of blades includes a generally radially inward extending arm 69 which is either welded to the hub 67 or may be formed as an integral part of one of the blades 68. The inner end of these arms 69 are engageable against the shaft 60 which acts as a stop in one direction of blade swing. The arms 69 contain an elongated slot 70 in which a clevis 71 having a roller 71a is slidably engaged. A resilient means, in the form of a tension spring 72, is anchored at one end to its disc and at its other end carries the clevis 71.

In this manner a spring 72 urges each set of blades in the forward direction (in respect to the direction of beater rotation at its lower side) until the arm 69 bears against the central shaft 60. The springs thus resiliently hold the blades in position and act as a cushioning means as they strike stones or the like. In addition to this resilient loading of the blades, the spring-slot connection permits rapid and additional release of the blades, on striking a sizeable obstruction, in a rearward direction until the obstruction has been passed over by the blades. During this auxiliary release movement of the blades, the roller 71a slides to the radially outward end of its slot 70 and decreases the effective moment arm of the spring as the blade swings in clearing the obstacle. The roller 71a assures complete and rapid release of the tooth and prevents any binding at the spring and slot connection. The blade is automatically and immediately returned to its normal position after it has been tripped and the obstacle cleared, by the spring as it slides to the other end of the slot.

It will be noted that the axis of rotation of the beater is aligned generally with the axis of the ground wheels in a fore and aft direction. The ground wheels thus act as gauge wheels and permit the beater blades to closely follow the contour of the ground.

*General*

As the machine is pulled over the ground, the P.T.O. shaft drives the beater in the direction indicated to throw stones and dirt forcibly against the ramp and/or onto the conveyor. Dirt, very small stones and other small foreign matter are separated from the larger stones and rocks either at the ramp or later on the conveyor. This material is thrown directly forwardly by the beater and with considerable force which requires the entire machine to be enclosed by its hood H.

The depth to which the beater penetrates below the surface of the ground is adjustable by the cylinder unit and generally the machine is designed to clear stones or rocks located on the surface of the ground or a few inches below the surface. Operation of the machine during subsequent years over a previously picked field will then pick up stones which have been brought closer to the surface by weather action or later plowing of the land.

The helical form of the rows of blades contributes materially to an even loading of the beater and more even distribution of power requirements because all of the blades of any one row do not contact the ground simultaneously. Having three rows of blades insures complete coverage of the ground within reasonable rotational speed of the beater.

The springs which hold the blades in working position provide a first stage of release for the blade in the nature more of a cushioning action, and upon hitting larger or more serious obstructions the spring slot connection permits additional blade release. Complete release of the blades is thus assured because the spring moment arm begins to decrease after the blades have moved a predetermined amount and this initiates the second release phase.

Positive return of the blades after the obstacle has been cleared is also insured because they are at all times under the influence of their springs.

The conveyor is located immediately ahead of the ramp and the beater is located as closely as practical to the ramp without necessitating any appreciable lifting action on the stones by the blades. As a result the entire machine is compact and of short length in a fore and aft direction. The compactness of the machine is also accomplished by the hood which covers all of the parts and confines the flying material to a limited area.

Various modes of carrying out the invention are contemplated as being within the scope of the following claims particularly pointing out and distinctly claiming the subject matter which is regarded as the invention.

I claim:

1. A mobile stone gatherer having a support frame including a front and rear portion and adapted to travel over the ground, an endless conveyor having an upper flight extending transversely across the front portion of said frame, a rearwardly and downwardly inclined ramp comprising a series of bars pivotally connected at their front end to said frame immediately behind said conveyor, said ramp having a lower end adapted to be dragged along the ground, ground wheels adjacent the rear portion of said frame, a rotary beater extending transversely across the frame and connected thereto and in substantial fore and aft alignment with said wheels and rotatably driven in a direction opposite to the direction of forward rotation of said wheels, said beater having rows of rigid blades for contacting stones on the ground and throwing them onto said ramp and said flight, means for resiliently holding said rigid blades in operative position and permitting them to swing to a release position, and a hood on said frame and extending over and enclosing said flight, ramp and beater.

2. A device as defined in claim 1, further characterized in that said rows of rigid blades are arranged in helical formation around said beater.

3. A combination as defined in claim 1, further characterized in that said means includes a sliding connection to thereby facilitate swinging of the blades.

4. A device as defined in claim 1, further characterized in that said beater comprises a generally cylindrical structure and said blades are arranged around the periphery of said structure in helical rows, said means comprises a spring, and a sliding connection between said spring and said blades for permitting additional and rapid rearward swinging of the blades and consequent release thereof when striking an obstacle of predetermined size.

5. A device as defined in claim 1, further characterized in that said beater comprises a series of axially spaced disk-like members having a central shaft extending therethrough to thereby define a rigid and generally cylindrical structure, and said means for resiliently holding said rigid blades is connected between said disk-like members and said blades.

6. A device as defined in claim 1, including adjustable means acting between said frame and said ground wheels and adapted to vary the height of said frame relative to the ground to thereby vary the depth of blade penetration into the ground.

References Cited in the file of this patent
UNITED STATES PATENTS

| | | |
|---|---|---|
| 2,213,370 | Reiter | Sept. 19, 1940 |
| 2,239,280 | Woznack | Apr. 22, 1941 |